US006951286B2

(12) United States Patent
Mueller et al.

(10) Patent No.: US 6,951,286 B2
(45) Date of Patent: Oct. 4, 2005

(54) SHOWERHEAD AND FILTER ASSEMBLY

(76) Inventors: John R. Mueller, N56 W16865 Ridgewood Dr., Menomonee Falls, WI (US) 53051; Patricia M. Mueller, N56 W16865 Ridgewood Dr., Menomonee Falls, WI (US) 53051

( * ) Notice: Subject to any disclaimer, the term of this patent is extended or adjusted under 35 U.S.C. 154(b) by 61 days.

(21) Appl. No.: 10/604,012

(22) Filed: Jun. 20, 2003

(65) Prior Publication Data

US 2004/0255377 A1 Dec. 23, 2004

(51) Int. Cl.[7] .......................... B01D 24/00; B01D 25/00; B01D 27/00; B01D 29/00; B01D 35/00

(52) U.S. Cl. ........................ 210/460; 210/449; 210/232; 210/236; 210/459; 210/461; 210/462

(58) Field of Search ................................ 210/232, 238, 210/236, 459, 460, 461, 462, 449

(56) References Cited

U.S. PATENT DOCUMENTS

| | | | | |
|---|---|---|---|---|
| 4,719,012 A | * | 1/1988 | Groezinger et al. | 210/232 |
| 4,933,080 A | | 6/1990 | Rundzaitia et al. | 210/232 |
| 5,152,464 A | | 10/1992 | Farley | |
| 5,213,688 A | | 5/1993 | Robinson | 210/440 |
| 5,549,822 A | | 8/1996 | Ferguson | 210/238 |
| D406,874 S | | 3/1999 | Farley | D23/209 |
| 6,267,887 B1 | | 7/2001 | Hughes et al. | 210/266 |
| 6,325,930 B2 | * | 12/2001 | Farley | 210/282 |
| 6,796,518 B2 | * | 9/2004 | Douglas et al. | 239/587.4 |

* cited by examiner

*Primary Examiner*—W. L. Walker
*Assistant Examiner*—Yoon-Young Kim
(74) *Attorney, Agent, or Firm*—Joseph S. Heino; Patrick M. Bergin

(57) ABSTRACT

A showerhead assembly includes a filter that is removably receivable by the showerhead. The showerhead includes a receiving opening defined within the downstream face of the showerhead, which opening is functionally adapted to receive the filter within it. The opening of the showerhead is interposed between the water inlet and water outlet of the showerhead and within the flow of water through the showerhead such that, when a filter is inserted into the opening, all water flowing through the showerhead also flows through the filter. The filter is readily insertable within the opening and it is easily removable from it. The filter includes means for securing it within the opening when the filter is inserted.

18 Claims, 6 Drawing Sheets

SHOWERHEAD AND FILTER ASSEMBLY

BACKGROUND OF INVENTION

This invention relates generally to showers, showerheads and water filters. More particularly, it relates to a showerhead and filter assembly wherein the showerhead is configured so as to receive the filter portion of the assembly through an opening and into a cavity defined within the showerhead and wherein the outer configuration of the showerhead remains essentially unchanged. It also relates to such an assembly wherein the filter portion is replaceable and may be quickly and easily removed from the showerhead cavity by means of the opening or may be securely inserted into the cavity as is desired or required by the user.

Showerheads are old art, as are water filters. Attempts have been made to utilize a showerhead in conjunction with or in proximity to a water filter whereby water flowing out of the discharge end of the showerhead has been filtered by the filter. Examples of such devices include those described and claimed in U.S. Pat. No. 5,152,464 to Farley, U.S. Pat. No. 5,213,688 issued to Robinson, and U.S. Pat. No. 5,549,822 issued to Ferguson. For the most part, each of those devices includes a separate filter unit that is interposed between the output of the water line and the input end of the showerhead. In the view of this inventor, replacement of the filter media from within the housing of the filter housing is not easily or readily accomplished in any of those devices. Furthermore, each device results in an aesthetically unpleasing device which is nothing short of unattractive.

Accordingly, it is an object of the present invention to provide a showerhead and filter assembly whereby the filter may be inserted directly into and within the showerhead to filter water flowing through the showerhead. It is another object to provide such an assembly whereby insertion of the filter within the showerhead does not alter the outer appearance or configuration of the showerhead. It is yet another object of the present invention to make the filter easily and readily removeable from the showerhead so as to facilitate replacement of the filter as such is desired or required by the user. It is still another object of the present invention to provide a means for securing the filter within the showerhead so as to prevent unintended displacement of the filter from the showerhead during normal shower operation. It is yet another object of the present invention to provide a showerhead and filter combination wherein the flow of water through the showerhead and filter is not unduly restricted by the presence of the assembly. It is still another object of the present invention to provide an assembly that is aesthetically pleasing from all visual viewpoints. It is still another object to provide such an assembly that is easy to assemble, economical to manufacture and simple to use.

SUMMARY OF INVENTION

The assembly of the present invention has obtained these objects. It provides for a showerhead and filter combination wherein the filter is removably receivable by the showerhead. The showerhead includes an axially aligned opening defined within the downstream face of the showerhead, which opening forms one part of an internal showerhead cavity that is functionally adapted to receive the filter within it. The axially aligned opening and cavity of the showerhead is disposed within the flow of water through the showerhead such that, when a filter is inserted through the opening and into the cavity, all water flowing through the showerhead also flows through the filter and the media contained within it. The filter is readily insertable within the opening and it is easily removable from it. The filter further includes means for securing it within the cavity when the filter is inserted.

The foregoing and other features of the present invention will be apparent from the detailed description that follows.

DETAILED DESCRIPTION

Figure 1:
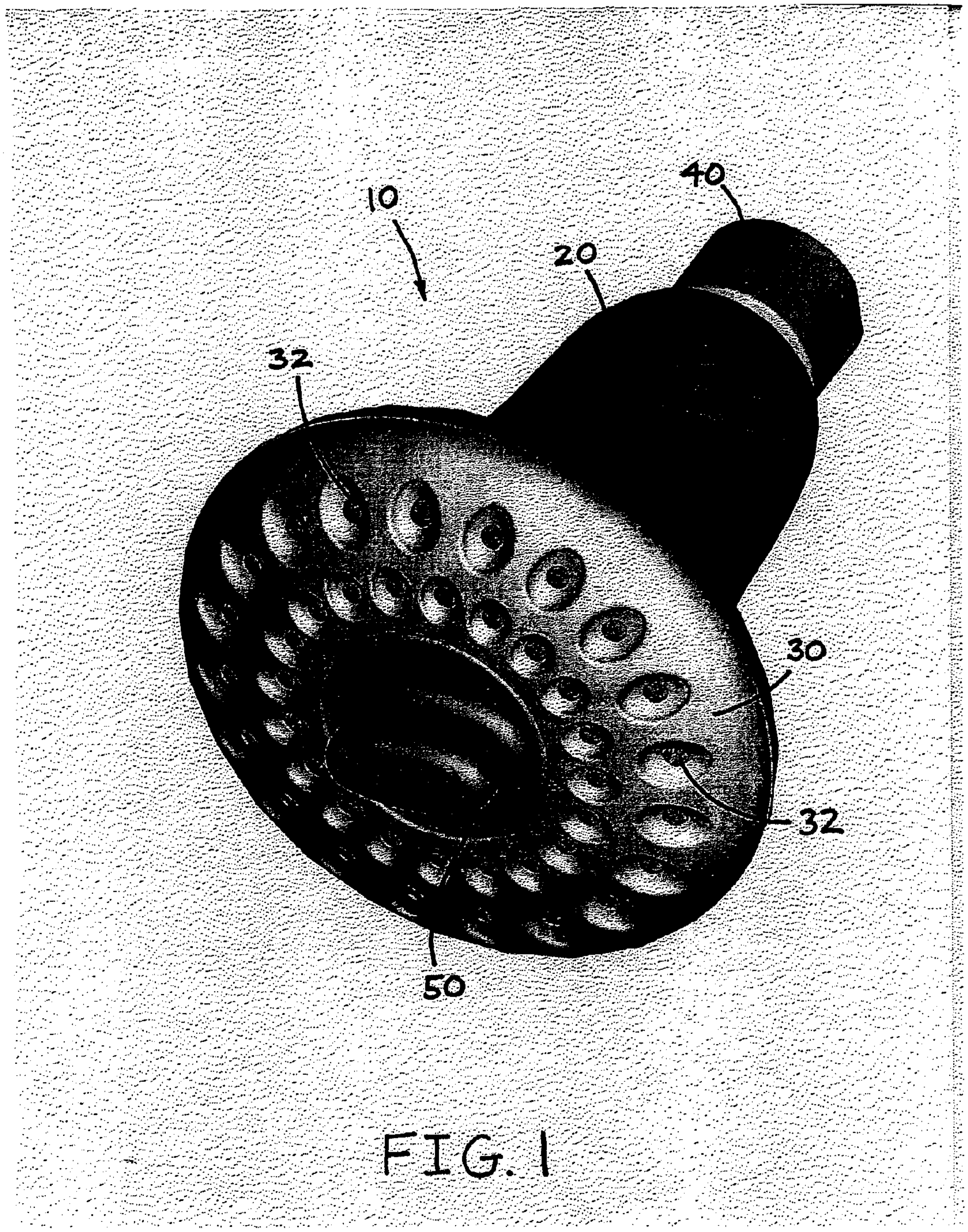
FIG. 1 is a top, front and right side perspective view of a showerhead and filter assembly constructed in accordance with the present invention.

Referring now to the drawings in detail wherein like numbers represent like elements throughout, FIG. 1 illustrates a perspective view of the shower head assembly, generally identified 10, constructed in accordance with the present invention. As shown, the assembly 10 includes the elements of an outer casing 20, a face member 30, a water inlet 40 and a filter member 50. When used as intended, water flows through a conventional water line (not shown) that is threadably received by the water inlet 40 and the water passes through and is contained by the outer casing 20, passes through the filter member 50, and is discharged from spray flow apertures 32 defined within the face member 30. It is to be understood that, although the preferred embodiment of the assembly as shown includes a face member 30, the face member 30 could be integrally formed as part of the outer casing 20, in which case the face member 30 would comprise the face portion 30 of the outer casing 20.

Figure 2:
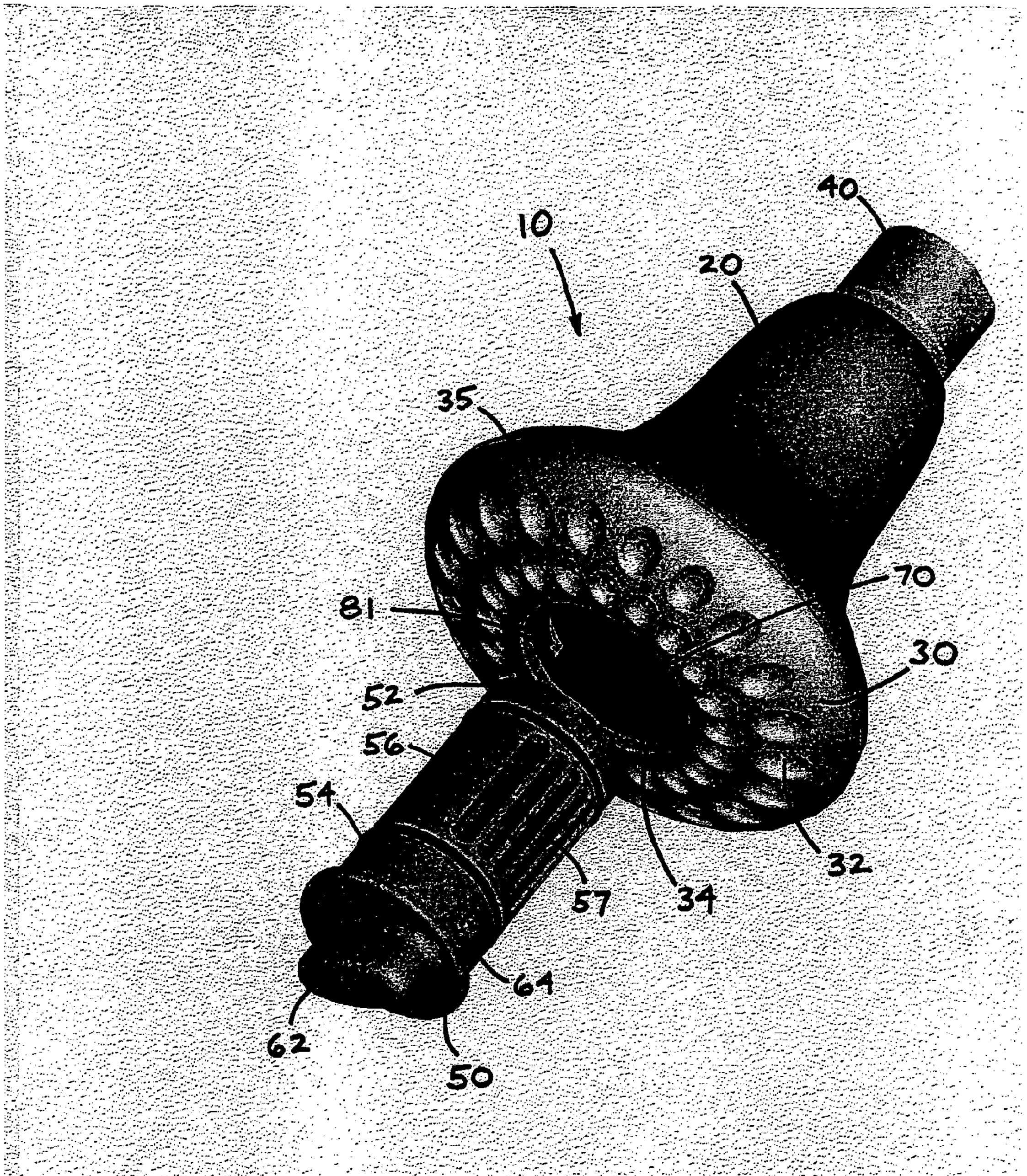
FIG. 2 is a slightly reduced front, top and right side perspective view of the assembly shown in FIG. 1 and showing the filter member in a removed position relative to the showerhead.
Figure 3:
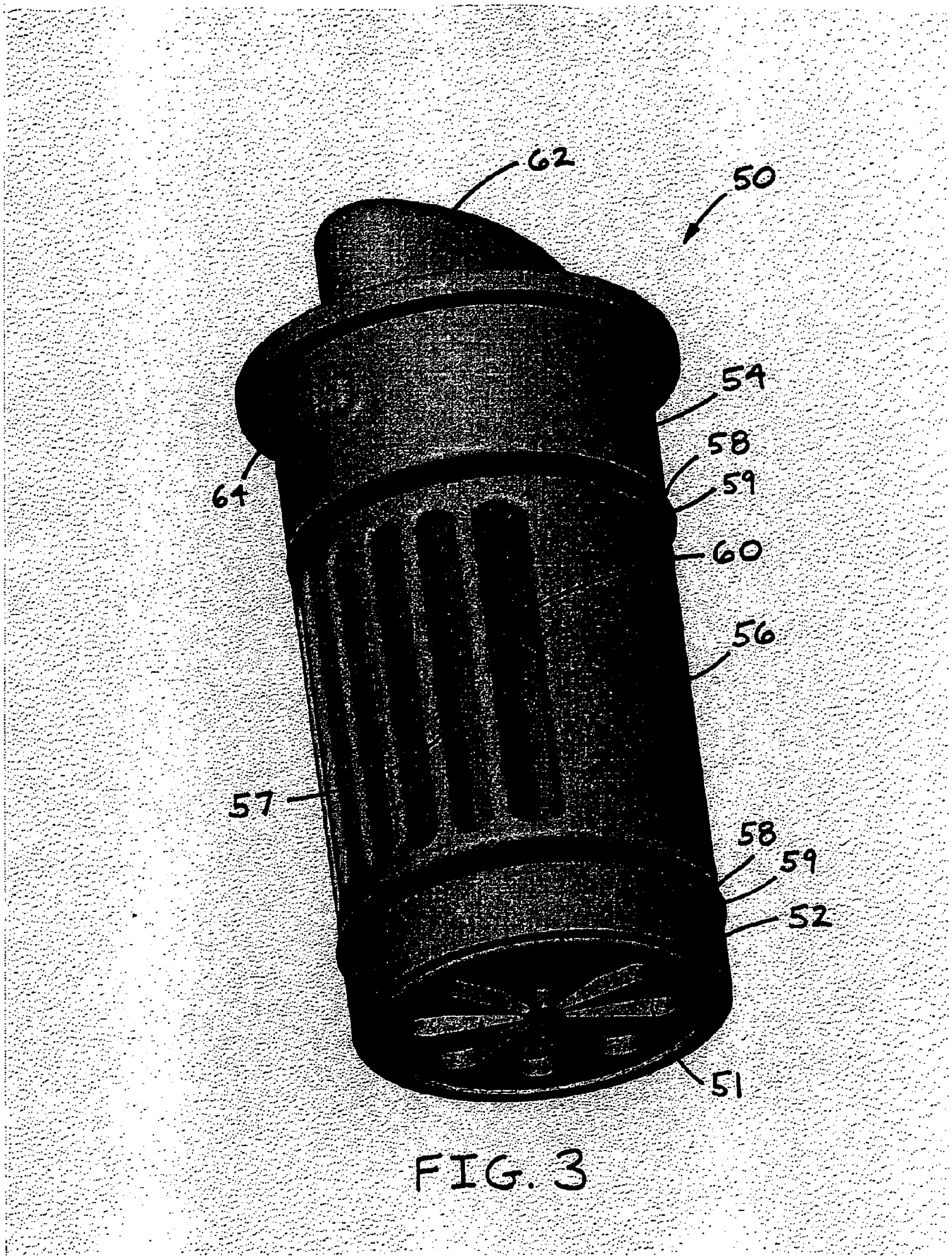
FIG. 3 is an enlarged top rear and right side perspective view of the filter member illustrated in FIG. 2.

Referring now to FIG. 2, it will be seen that the filter member 50 is removable from the assembly 10 by means of a central opening or aperture 34 defined within the face member 30 of the assembly 10. This opening 34 is the entry way to a cavity 8 that is defined within the axial center of the outer casing 20. It should also be noted that the opening 34 and the cavity 8 could lie at a point within the outer casing 20 other than the axial center and still come within the scope of the present invention. Aesthetically, this is not, however, as desirable as that which is described in the preferred embodiment.

Figure 4:
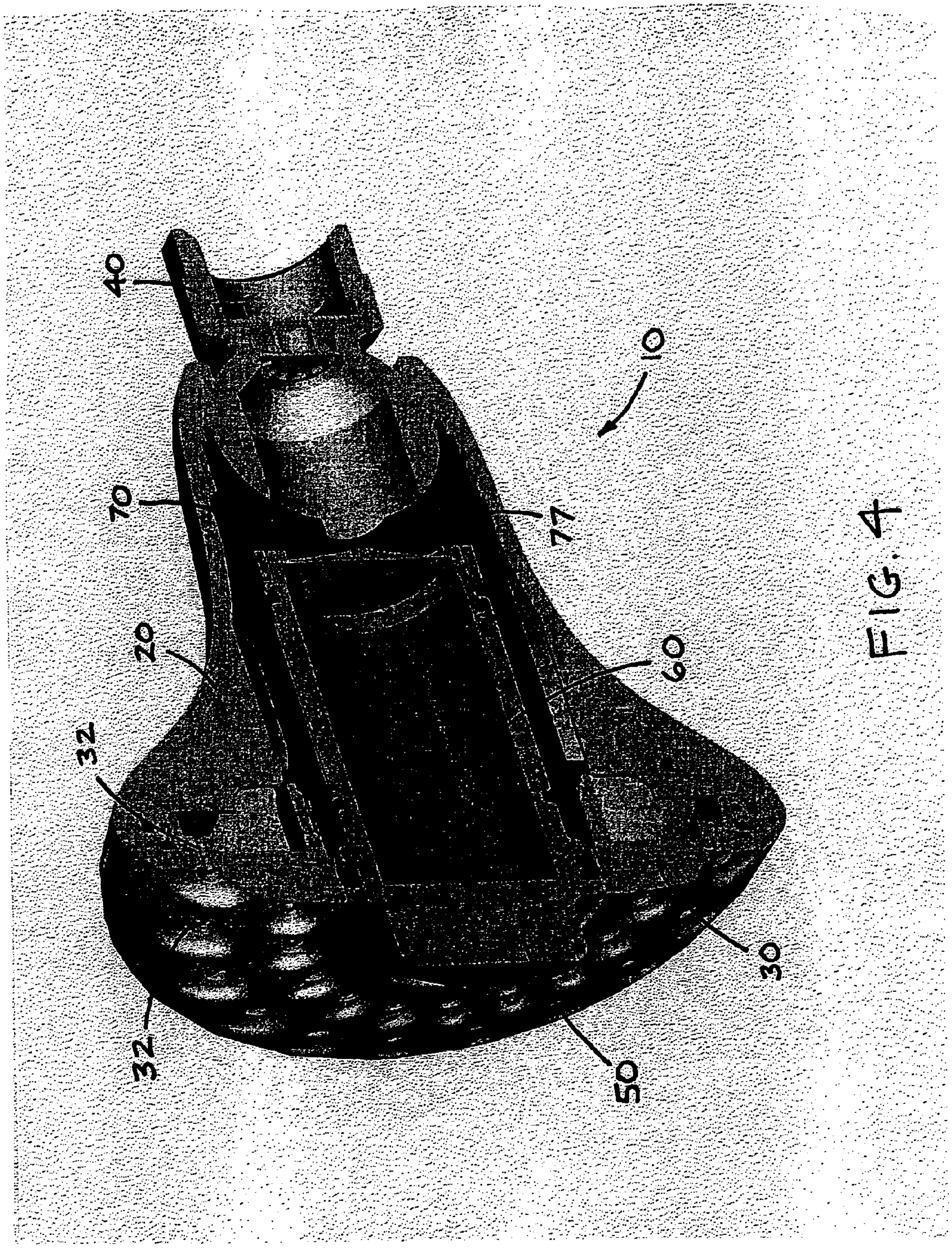
FIG. 4 is a front, top and right side cross sectioned perspective view of the assembly illustrated in FIG. 1.
Figure 5:
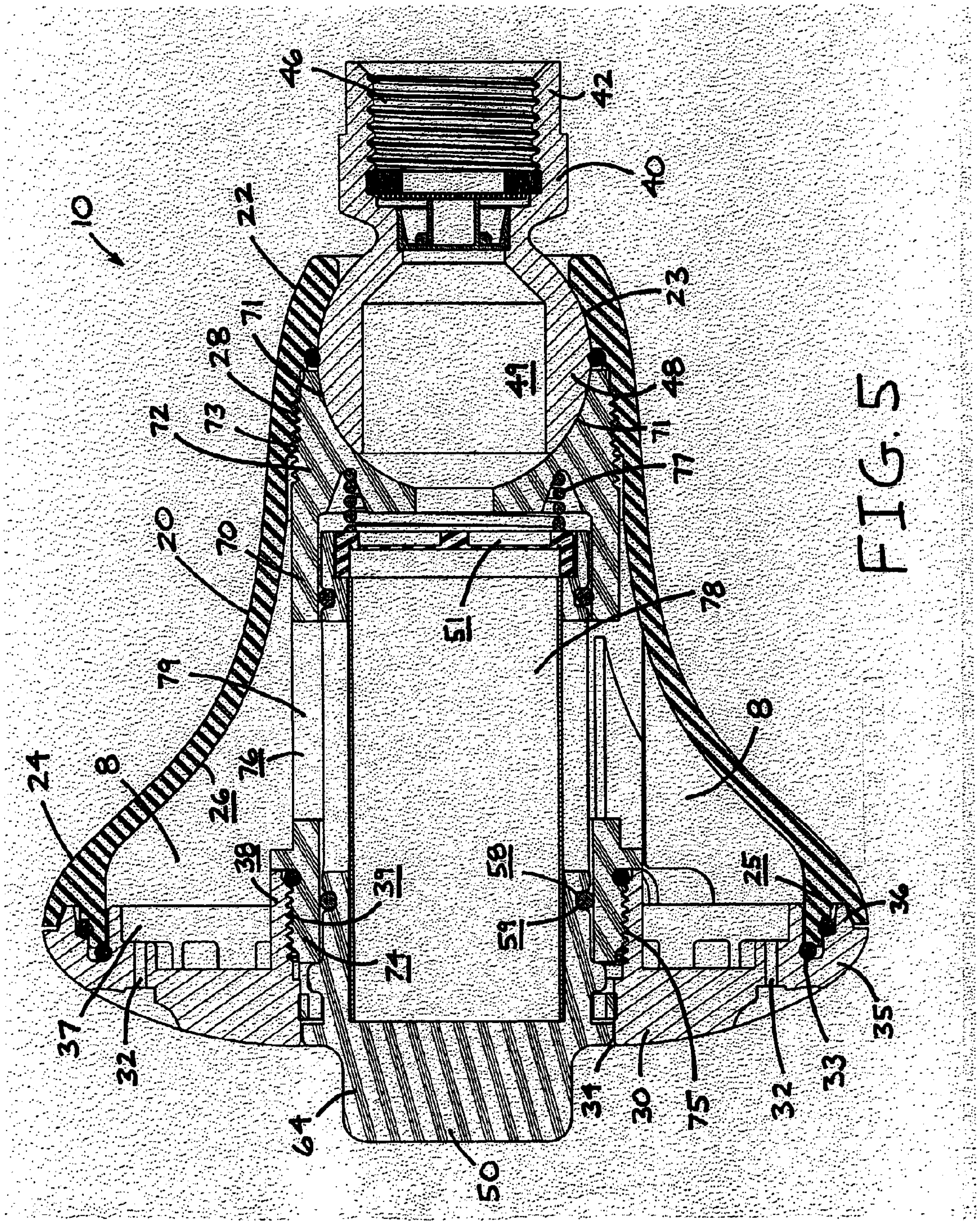
FIG. 5 is a left side elevational and cross sectioned view of the assembly illustrated in FIG. 1.
Figure 6:
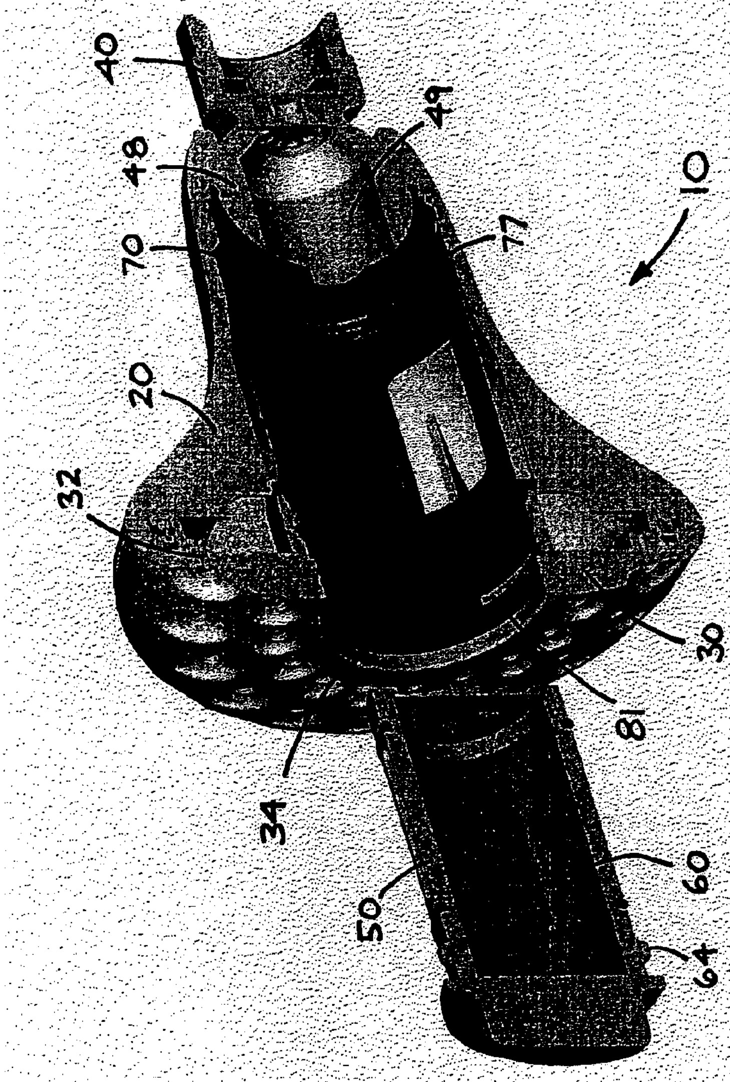
FIG. 6 is a front top and right side elevational and cross sectioned view of the assembly and showing the filter member in a removed position relative to the assembly.

Referring now to FIGS. 4, 5 and 6, the outer casing 20 includes a first or proximal end 22 that is upstream of the flow of water through the outer casing 20. The outer casing 20 also includes a second or distal end 24 that is at the downstream flow of water through the outer casing 20. The outer casing 20 also includes an interior casing surface 26 that provides the partial enclosure of a cavity 8 that is formed within the assembly 10. Towards the first or proximal end 22 of the interior surface 26 of the outer casing 20 are internal threads 28 and a spherically concave surface 23, the purpose of which will become apparent later in this detailed description.

In the preferred embodiment, the showerhead assembly 10 includes a face member 30 that includes an outer perimeter 35. The outer perimeter 35 of the face member 30 is engagable with the second or distal end 24 of the outer casing 20. As shown in FIG. 5, the outer perimeter 35 of the face member 30 includes a circumferential ridge 36 that is engagable with a circumferential groove 25 that is defined within the second or distal end 24 of the outer casing 20. A number of "o-rings" 33 are disposed between the face member 30 and the outer casing 20 to provide a water seal between those two members 20, 30 at that point in the assembly. See FIG. 5. The face member 30 also includes an inner surface 37 that provides another partial enclosure of the cavity 8 that is formed within the assembly 10.

The face member 30 includes a plurality of small apertures 32 that are provided to allow for water to flow through the face member 30. In this fashion, the showerhead assembly 10 functions as would a conventional showerhead. A centrally located receiving aperture 34 is also provided through which the filter member 50 may be inserted. Inwardly of the face member 30 is a face support member 38 which support member includes internal threads 39, the purpose of which will become apparent later in this detailed description.

In the preferred embodiment, and towards the first or proximal end 22 of the outer casing 20, is a water inlet member 40. The water inlet member 40 includes a water receiving portion 42 having a number of internal threads 46 disposed within it. The purpose of the internal threads 46 is to allow the water inlet member 40 to be threadably secured to the male end of a conventional water pipe (not shown) as would be found to be protruding from the wall of a shower enclosure. The downstream portion of the water inlet member 40 includes a ball portion 48 having an axial bore 49 defined within it.

In the preferred embodiment of the assembly 10 of the present invention, a filter retention member 70 is also included. See FIG. 5. It is to be understood that this intermediate member 70 could be eliminated by design where the filter face support member 38 would extend far enough into the outer housing 20 and include external threads (not shown) so as to be somehow engageable with the internal threads 28 of the outer housing 20. In the preferred embodiment as is described, the filter retention member 70 includes a first or proximal end 72, a second or distal end 74, and a central support portion 76 extending between the two ends 72, 74. The first or proximal end 72 is externally threaded 73, which threads 73 are threadably engagable with the internal threads 28 of the outer casing 20. The first or proximal end 72 also includes a spherical socket surface 71 that is functionally adapted to receive a portion of the ball 48 of the water inlet member 40. The second or distal end 74 of the filter retention member 70 is likewise externally threaded 75, which threads 75 are threadably engageable with the internal threads 39 of the face support member 38. The filter retention member 70 further includes, at its proximal end 72, a spring 77. The spring 77 is used to bias the filter member 50 towards the face 30 of the assembly 10 when the filter member 50 is properly inserted. The filter retention member 70 forms a retention member cavity 78 within it. Water is capable of passing through the filter retention member 70 by virtue of a plurality of openings 79 defined within the central support portion 76. In this way, a water flow continuum is created through the outer casing 20, through the filter retention member 70 and through the face member 30 of the assembly 10.

Referring now to FIGS. 2 and 6 in particular, the assembly 10 of the present invention includes a filter member 50. As shown, the filter member 50 includes a first or proximal end 52 and a second or distal end 54. The proximal end 52 of the filter member 50 is that portion of the filter member 50 that is inserted first through the face member aperture 34 when the filter member 50 is first placed into the assembly 10. Extending between the first end 52 and the second end 54 of the filter member 50 is a central filter portion 56. The first end 52 of the filter member 50 includes a plurality of water inlet apertures 51 defined within it. Similarly, the central filter portion 56 includes a number of longitudinally extending water outlet slots 57 defined within it. These apertures 51 and slots 57 are provided to allow for the passage and flow of water through the filter member 50. Internally of the filter member 50 is a filter media 60. The precise type of filter media 60 used is not a limitation of the present invention and may include those types used to filter, for example, chlorine, iron oxide, lead, and other water additives, contaminants, or naturally occurring minerals and elements. It will be seen that the filter member 50 of the preferred embodiment includes a pair of o-rings 59 about the periphery of the filter member 50, such o-rings 59 being retained within grooves 58 defined within the member 50, to contain water flow between the filter member 50 and the filter member retention member 70 in the area of the filter member slots 57 when the filter member 50 is properly in place. In order to facilitate rotation of the filter member 50, the distal end 54 of the filter member 50 includes a toggle handle 62. And to facilitate securing the filter member 50 in place, a pair of opposing keys 64 are provided each of which extends outwardly from the filter member 50. The filter member keys 64 are engageable within a pair of slotted keyways 81 defined within the distal end 74 of the filter retention member 70.

Based upon the foregoing, it will be seen that there has been provided a new and useful showerhead and filter assembly whereby the filter may be inserted directly into and within the showerhead to filter water flowing through the showerhead; whereby insertion of the filter within the showerhead does not alter the outer appearance or configuration of the showerhead; which makes the filter easily and readily removeable from the showerhead so as to facilitate replacement of the filter as such is desired or required by the user; which provides a means for securing the filter within the showerhead so as to prevent unintended displacement of the filter from the showerhead during normal shower operation; wherein the flow of water through the showerhead and filter is not unduly restricted by the presence of the assembly; and which provides an assembly that is aesthetically pleasing from all visual viewpoints.

What is claimed is:

1. A showerhead assembly which comprises an axially symmetrical hollow body defining a body cavity and having a water inlet end, a water outlet end and a continuous outer surface, the body having a generally circular cross section in the axial direction, a face portion, said face portion being disposed to cover the outlet end of the hollow body and having an outer surface, the face portion including a substantially cylindrical-shaped receiving aperture defined within it, said receiving aperture extending into the body cavity of the hollow body from the outer surface of the face portion and being located at the axial center of the hollow body, the face portion further having an outer rim and further including a plurality of water flow apertures defined within it, the water flow apertures being disposed between the receiving aperture and the outer rim of the face portion, and a substantially cylindrical-shaped filter member, said filter member being inserted within the face portion receiving aperture to dispose the filter member between the inlet end and the outlet end of the hollow body, wherein the filter member is disposed within the showerhead assembly to filter water flowing through the hollow body.

2. The assembly of claim 1 wherein the filter member has a first end having at least one water inlet defined in it, a second end, and a substantially cylindrical-shaped outer surface extending between the first and second ends, the outer filter surface having at least one water outlet defined in it, the assembly including an inner casing portion wherein the inner casing portion is disposed between the hollow body and the face portion, said inner casing portion being configured to allow water to pass through the at least one water inlet of the first end of the filter member as water enters the inlet end of the hollow body and then pass through the at least one water outlet of the outer surface of the filter member and through the inner casing portion, such that water is discharged from the water flow apertures of the face portion.

3. The assembly of claim 2 wherein the hollow body includes means for securing the inner casing portion between the hollow body and the face portion.

4. The assembly of claim 3 wherein the filter member includes means for releasably securing the filter member within the face portion.

5. The assembly of claim 4 wherein the filter member securing means includes at least one key and at least one cooperating keyway disposed between the filter member and the inner casing portion, said keyway being adapted to receive the key therewithin.

6. The assembly of claim 5 wherein the inner casing portion includes spring means for biasing the filter outwardly of the face portion.

7. The assembly of claim 6 wherein the filter member is disposably replaceable.

8. The assembly of claim 7 wherein the face portion is integrally formed as part of the hollow body.

9. A showerhead which comprises an axially symmetrical outer casing defining casing cavity and having a water inlet end and a water outlet end, a face member for covering the water outlet end of the outer casing, said face member having an outer surface and including an outer rim, a filter-receiving aperture defined within the outer surface, a substantially cylindrical-shaped filter-receiving cavity extending from the filter-receiving aperture and into the casing cavity, the filter-receiving cavity being located at the axial center of the outer casing, the face member further having a plurality of water spray apertures defined within it, the water spray apertures being disposed between the receiving cavity and the outer rim of the face member.

means for sealingly securing the face member to the water outlet end of the casing, a substantially cylindrical-shaped water filter, said water filter being inserted through the filter-receiving aperture and into the filter-receiving cavity of the face member, and means for sealingly engaging the water filter within the receiving cavity of the face member, wherein the filter is disposed within the showerhead outer casing cavity to filter water flowing through the outer casing.

10. The showerhead of claim 9 wherein the filter member includes a first water inlet end, a second end and a substantially cylindrical-shaped outer outlet surface extending between the first and second ends and having a plurality of openings through which water may pass and a filter medium contained within it.

11. The showerhead of claim 10 wherein the filter member securing means includes at least one key and at least one cooperating keyway disposed within the showerhead, said keyway being adapted to receive the key therewithin.

12. The showerhead of claim 11 including spring means for biasing the filter outwardly of the face member.

13. The showerhead of claim 12 wherein the filter member is disposably replaceable.

14. The showerhead of claim 13 wherein the face member is integrally formed as part of the hollow body.

15. The showerhead of claim 14 wherein the filter receiving cavity comprises an inner casing.

16. The showerhead of claim 15 including means for securing the inner casing between the hollow body and the face member.

17. The showerhead of claim 16 wherein the inner casing is disposed between the outer casing and the face member, said inner casing being configured to allow water to pass through it when water enters the inlet end of the outer casing and when water is discharged from the water flow apertures of the face member.

18. The showerhead of claim 17 wherein the outer casing includes internal threads, the face member aperture includes internal threads, and the inner casing includes a first end and a second end, the first and second ends of the inner casing being externally threaded, wherein the first end of the inner casing is threadably receivable by the outer casing and the second end of the inner casing is threadably receivable by the face member for securing the inner casing between the outer casing and the face member.

* * * * *